US006698524B2

United States Patent
Bernhardt et al.

(10) Patent No.: US 6,698,524 B2
(45) Date of Patent: Mar. 2, 2004

(54) IMPLEMENT HITCH AND CONTROL SYSTEM

(75) Inventors: Gerd Bernhardt, Hanichen (DE); Sergiy Fedotov, Dresden (DE); Ruslan Rudik, Dresden (DE); Heinz Weiss, Bensheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/128,319

(22) Filed: Apr. 23, 2002

(65) Prior Publication Data

US 2002/0157841 A1 Oct. 31, 2002

(30) Foreign Application Priority Data

Apr. 27, 2001 (DE) .......................................... 101 20 732

(51) Int. Cl.⁷ .......................................... A01B 63/112
(52) U.S. Cl. ........................................................ 172/7
(58) Field of Search ............................. 172/4, 5, 6, 7, 172/2, 439, 444, 239

(56) References Cited

U.S. PATENT DOCUMENTS 4,508,178 A * 4/1985 Cowell et al. ............... 172/239
4,825,956 A * 5/1989 Kanato et al. ................. 172/2
4,909,331 A * 3/1990 Defranco ......................... 172/4
6,321,851 B1 11/2001 Weiss et al. ................. 172/444

FOREIGN PATENT DOCUMENTS

| DE | 31 07 137 A1 | 9/1982 |
| DE | 196 39 573 A1 | 4/1998 |
| EP | 1 084 602 A1 | 3/2001 |

* cited by examiner

Primary Examiner—Robert E. Pezzuto

(57) ABSTRACT

A hitch for coupling an implement to a utility vehicle includes adjustable length coupling elements and a pivotal coupling unit coupled thereto. A control system automatically controls the length of the coupling elements to control the direction of the line of action of the draft forces, the position of the towing point defined by the coupling unit, and the orientation of the Implement relative to the utility vehicle. The control system includes sensors for sensing the position of the implement relative to the vehicle, for determining a set of reference positions, and for sensing forces applied to the coupling elements. The control system also automatically controls the length of the coupling elements as a function of the sensor signals.

23 Claims, 3 Drawing Sheets

IMPLEMENT HITCH AND CONTROL SYSTEM

FIELD OF THE INVENTION

The invention relates to an implement hitch and a control system therefore.

BACKGROUND OF THE INVENTION

The towing force between the utility vehicle and the implement may depend in particular on the sideways orientation of the implement relative to the utility vehicle. In August van der Beek: "Die Lage des ideellen Fuehrungspunktes und der Zugkraftbedarf beim Pfluegen" Grundlagen der Landtechnik (1983) Nr.1, s. 10–13 ("The Position of the Ideal Guide Point and the Towing Force Requirement During Plowing", Fundamentals of Agricultural Technology (1983) No. 1 page 10–13), a system was examined which consisted of an agricultural tractor with a plow coupled to a three-point linkage. The plow included a repositioning system for influencing the position of the three-point linkage and thereby to determine the position of the ideal guide point (towing point). The ideal guide point in this case results from the intersection of the extension of the pivotal two hitch links and determines orientation of the resulting forces between tractor and plow. The factors to be considered include, among others, track width, tire width, wheel base, front axle load as well as the number of driven wheels of the tractor, and the size, number, shape and operating width of the plow components. It was found that the towing force of a plow coupled to a tractor can be minimized if the ideal guide point is repositioned to the side of the furrow.

The coupling points of a plow are usually moved sideways relative to its frame by means of a coupling unit mounted on the plow, such as repositioning spindles described in DE-A-31 07 137, or hydraulic cylinders described in DE-A-196 39 573.

DE-A-196 39 573 describes a tractor with a plow coupled thereto via a conventional three-point linkage or hitch in which an optimum repositioning of the plow is to be attained by comparing the lower steering arm forces. For this purpose, the lower steering arm forces are measured by a separate force sensor. The relationship of the lower steering arm forces is used as a control value which is compared with a target value that can be provided by the operator. As a function of the difference, a double acting hydraulic cylinder is controlled to control the position of the plow and the hitch, in order to reposition the position of the ideal guide point for the line of action of the resulting forces between the tractor and the plow.

Hydraulic cylinders can control the width of the furrow and reposition the towing point. However, the plow must be equipped with its own control or regulating system. If a user wants to use several implements in connection with a utility vehicle, then he must invest in several control systems, which is costly. By varying the configuration of these control systems, the demands on the operator increase.

SUMMARY OF THE INVENTION

An object of the invention is to provide a hitch and a control system which solves the aforementioned problems.

In particular, an object of the invention is to provide a hitch and a control system which automatically, upon certain conditions, repositions the towing point and the line of action of towing forces and/or the operating width and the angle of inclination of the implement, without the need for each of the implements being provided with its own control system.

These and other objects are achieved by the present invention wherein a hitch couples an implement to a self-propelled utility vehicle, such as a tractor. The hitch includes adjustable length coupling elements and a coupling unit for coupling the implement to the hitch. The coupling unit pivots the implement freely (not controlled) relative to the utility vehicle, so that the implement can reposition itself in response to forces. A control system controls the length of the coupling elements in order to control the operating line of the draft forces, and/or the position of a towing point defined by the coupling unit, and/or an angle of inclination of the implement.

In contrast to the state of the art, the coupling unit can pivot freely in a horizontal plane within certain limits. The hitch is controlled to control position of implement relative to the utility vehicle. Thus, each implement need not be equipped with its own repositioning system. Rather, only a control system associated with the utility vehicle is required. This reduces cost and simplifies the operation because the operation of different control systems need not be learned.

With this hitch, the towing point can be repositioned automatically so that the operating line of the draft forces conform with the desired requirements, and to improve the transmission of the forces to the ground and reduce friction forces between the plow and the ground. This can reduce energy consumption by up to 15%. The torque about a vertical axis of rotation can be reduced, so that the operator is relieved of frequent counter-steering.

The hitch includes lower hitch links which are engaged at the sides by hydraulic cylinders, as is shown by EP-A-1 084 602. Preferably, the hitch includes six adjustable length coupling elements arranged in the form of a hexapod, such as described in greater detail in German patent application P-199 51 840 8, which is incorporated by reference herein.

The hexapod defines a coupling plane which defines a set of coupling reference positions, and can be controlled and moved actively and repositioned within a given operating region relative to the utility vehicle, particularly in a horizontal plane. The coupling unit defines a coupling plane associated with the implement which can be freely moved relative to the implement frame.

Preferably, position sensors sense the length of the coupling elements. The actual position of the coupling plane and the coordinates of the coupling points of the hitch can be determined from the sensed lengths.

Force sensors sense the tension and compression forces in the coupling elements to determine the magnitude and the direction of application or the line of action of the draft forces produced by the implement engaging the ground.

Preferably, the coupling elements support a coupling frame which includes coupling members, such as hooks (which define coupling points), for coupling the implement to the utility vehicle. A coupling carrier is coupled to the side of the implement and is mounted on the coupling points. Fixed coupling points on a coupling frame permit a simple and rapid coupling.

With a hexapod type hitch the implement can be moved in the longitudinal direction of the vehicle as well as upward and to both sides. It is also possible to rotate the implement about the longitudinal axis of the vehicle or to pivot it about a horizontal or vertical axis. However, only a limited rotation about a longitudinal axis is possible with the hexapod hitch. Therefore, a rotary mechanism is provided between the coupling frame and the coupling carrier of the implement, which permits rotation of the implement about a generally longitudinal axis. A sensor senses the rotational angle of the rotary mechanism.

When a plow is inserted into the ground, the plow does not immediately cut in the proper furrow width. A plow may also be forced out of its normal position by an obstacle, such as a stone or a root. For this reason the kinematics of conventional hitches have been designed to rapidly return a plow to its normal position after it has been displaced therefrom.

According to the present invention, however, the coupling elements of the hitch are not freely movable during an automatic repositioning of the towing point, so that their convergence has no effect upon the return movement. Preferably, the kinematics of the coupling unit conforms to the requirements of the convergence of the lower hitch links of the power lift.

Thus, preferably, the coupling unit includes a pair of horizontally spaced apart tie rods. The tie rods may be rigid hitch links which form a four-bar linkage coupled to the implement and to the coupling carrier and pivotal about vertical axis. Preferably, the tie rods convergence in a generally horizontal plane and are closer together in the direction of the utility vehicle. A point of intersection of the axes of the tie rods forms an ideal guide point or towing point.

If the hitch is slid to the side the coupling carrier rotates somewhat about a vertical axis depending on the convergence of the tie rods. The control system controls the hexapod hitch to rotate the coupling frame about a vertical axis by an amount which corresponds to the rotation of the coupling carrier. Thus, the coupling points may be shifted in a horizontal plane without changing the relative position between the utility vehicle and the implement.

This shifts the guide point or the towing point to the side. In case of a plow, the towing point can, for example, be repositioned to the side of the furrow so that the side forces acting on the sides of the plow are absorbed by the utility vehicle. With shifting the towing point further towards the side of the furrow, the side forces acting on the plow are reduced. If the line of action of the draft forces do not act through the normal axis of the utility vehicle, a torque about the normal axis develops. The torque increases with the deviation of the line of action from the normal axis. The increasing torque requires the operator to apply counter steering to an increasing degree in order to operate the vehicle through the furrow. Repositioning of the towing point from the normal axis of the vehicle to the side of the furrow reduces the friction forces and increases the torque. In a vehicle with pure rear wheel drive without a differential lock the normal axis can extend through the center of the rear axle.

In addition to length sensors for the coupling elements, a deflection angle sensor is used to determine the position or orientation of the implement relative to the coupling plane or the coupling carrier.

With this invention the direction of the line of action of the draft forces or the position of the towing point defined by the coupling unit and/or the angle of inclination between the utility vehicle and the implement can be conformed automatically to requirements.

However, during transport operation, an implement which is freely movable and rotatable in an uncontrolled manner may be bothersome or even dangerous. Therefore, a blocking means is provided through which the coupling unit can be selectively prevented from a sideways deflection and/or an inclination, particularly a rotation about the longitudinal axis of the vehicle. The blocking means includes a variable length element which is coupled to the implement frame and to the coupling carrier, and which can be fixed with respect to its length, such as a hydraulic cylinder controlled by a blocking valve. The hitch is controlled by a control system.

The control system includes a sensor arrangement that detects the relative position of the vehicle body (vehicle chassis, vehicle frame or some other reference point fixed to the vehicle) on the one hand and the implement frame on the other hand for a coupling reference system. The coupling reference system is defined, for example, by coupling or fastening points. It can, however, be defined by freely selected spacial parameters that lie in the region of the fastening planes. As an alternative or in addition to the detection of position the sensor arrangement can also detect the forces in the coupling elements that can be repositioned in length. Furthermore the control system contains control means that transmit control signals in order to automatically influence the length of at least one coupling element that is variable in length as a function of the sensor signals.

Preferably the control system generates control signals on the basis of the sensor signals and the vehicle and implement configuration by means of which the line of action of the resulting ground resistance and/or the position of the towing point defined by the coupling unit and/or the width of the furrow and/or the angle of inclination between the utility vehicle and the implement can be repositioned automatically in a pre-set manner directly or indirectly. In this way the front width of the furrow can be changed automatically, an automatic repositioning of the angle of inclination can be performed and/or the towing point can be repositioned automatically transverse to the direction of operation.

DETAILED DESCRIPTION

Figure 1:
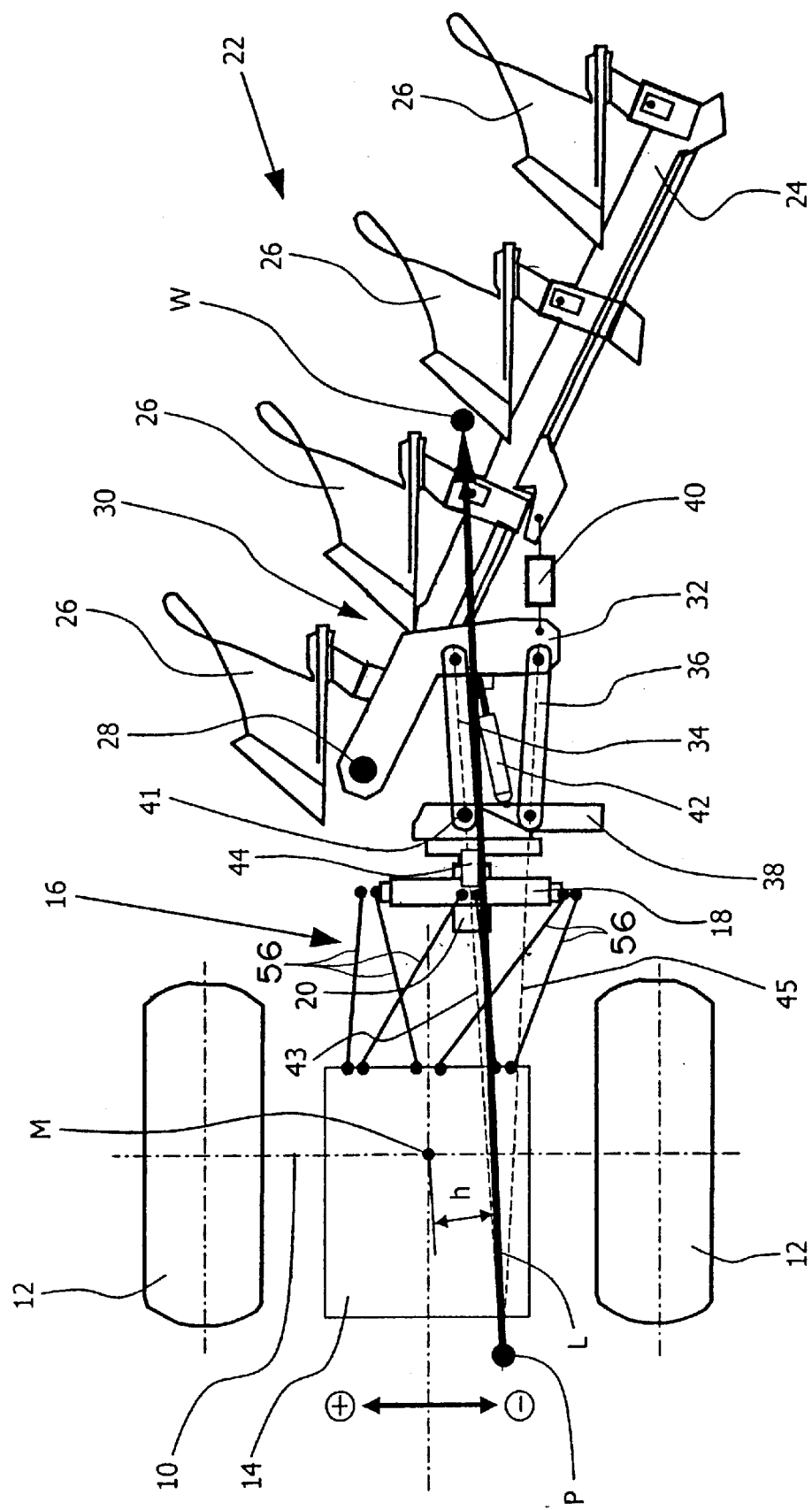
FIG. 1 is a schematic view of a plow coupled to the rear of a tractor by a hitch according to the present invention.
Figure 2:
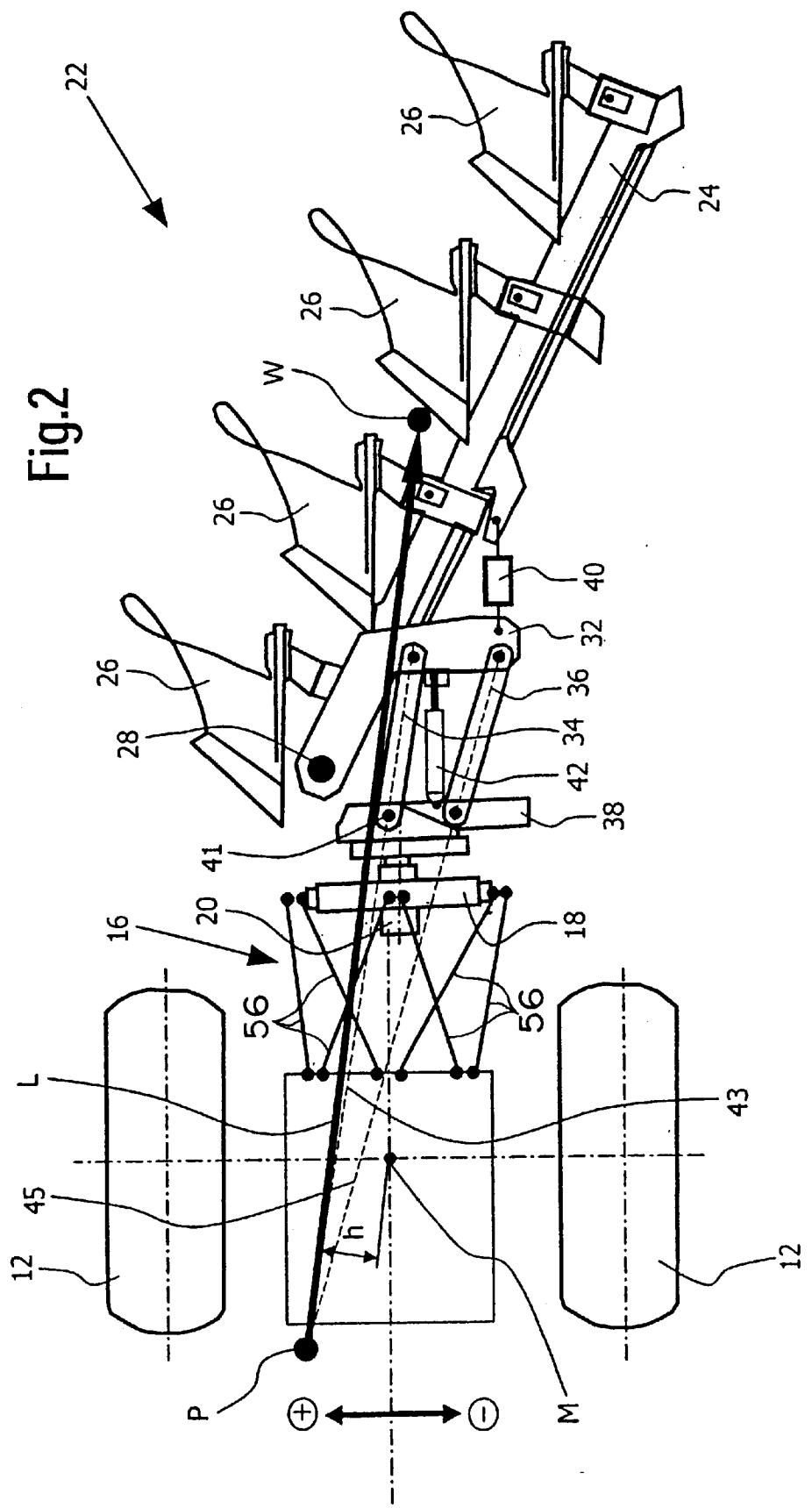
FIG. 2 is a view similar to FIG. 1, wherein the hitch is shifted relative to the position shown in FIG. 1.

Referring to FIGS. 1 and 2, a vehicle rear axle 10 of an agricultural tractor (not shown) includes two wheels 12. Between the wheels 12 a gearbox unit is located with a differential gearbox housing 14, which forms a part of the tractor body. The utility vehicle is driven only by the rear wheels. As long as no differential lock is applied the normal axis of the vehicle extends through the center M of the rear axle.

A hitch 16 is mounted to the rear of the housing 14. Hitch 16 includes six adjustable length coupling elements 56, which are arranged in the form of a hexapod, and which are double acting hydraulic cylinders or electro-mechanical repositioning elements. Although not shown in FIGS. 2 and 3, each of the six coupling elements 56 includes an integral force sensor 54 and a position or length sensor 58. Sensors 58 may length measurement sensors such as described in Landtechnikzeitschrift profi, Nr. 1/01, Seite 71 [Agricultural Technique Periodical profi, No.1/01, Page 71].

The coupling elements 56 have their first ends coupled in pairs to the corners of a triangular frame on the housing 14. The other ends of the coupling elements 56 are coupled in pairs to the corners of a triangular coupling frame 18 which is rotated through 180 degrees with respect to the triangular frame on the housing 14. Such a coupling element arrangement was described in detail in German patent application P-199 51 840.8, which is incorporated by reference herein. The coupling frame 18 carries a rotary mechanism 20 in its central region.

A rotary plow 22 includes four pairs of plow bodies 26 fastened to a frame 24. A coupling unit 30 includes a pivot arm 32 which is coupled to the frame 24 by a generally vertical articulated shaft 28 and by a hydraulic cylinder 40. The coupling unit 30 also includes a pair of tie rods 34, 36 and a coupling carrier 38. The pivot arm 32 can be pivoted relative to the frame 24 by the hydraulic cylinder 40 in order to adjust the width of cut of the plow 22. A rotary angle sensor (not shown) is integrated into the articulated shaft 28. The hydraulic cylinder 40 is controlled as a function of the signals from rotary angle sensor signals or by a regulating system (not shown) to control the width of cut.

The two rigid tie rods or hitch links 34, 36 are coupled with one end to the pivot arm 32 and with the other end to the coupling carrier 38. To improve stability, two pairs of tie rods could also be used with two tie rods located above each other. The tie rods 34, 36 are pivotal about generally vertical pivot axis, so that the tie rods 34, 36 move in a horizontal plane. A rotary angle sensor 41 senses the rotary angular position of the coupling unit 30. The two tie rods 34, 36 are not parallel to each other, but converge towards each other in the direction of the utility vehicle. The point of intersection of the two axes 43, 45 of the tie rods forms an ideal guide point P or towing point.

A blocking element 42 extends between the pivot arm 32 and the coupling carrier 38. The blocking element 42 is oriented at an angle with respect to each of the tie rods 34, 36. In its unlocked condition, the length of the blocking element 42 adjusts to the space requirements of the pivoting of the coupling unit 30. The length of the blocking element 42, however, can be fixed, so that it applies tension to the tie rods 34, 36 and does not permit any relative motion between the coupling carrier 38 and the pivot arm 32. In the locked condition the coupling unit 30 is rigid. The blocking element 42 may, for example, be a hydraulic cylinder whose hydraulic chambers are connected by a valve system (not shown) with a reservoir. If the valve system is closed then fluid cannot flow between the chambers and the reservoir, and the blocking cylinder 42 is rigid and has a fixed length.

The coupling carrier 38 is connected via the rotary mechanism 20 with the coupling frame 18 of the hitch 16. The rotary mechanism 20 makes it possible to rotate the rotary plow 22 about the longitudinal axis of the vehicle from a first operating position into a second operating position. The rotary position is detected by a rotary angle sensor 44 or by an inclination angle transmitter. The rotary mechanism 20 contains a drive (not shown), by means of which the rotary plow 22 can be rotated between the operating positions. The drive also permits a repositioning of the rotary angle in order to reposition the inclination of the plow with respect to the utility vehicle to a desired value.

A line connecting the point of attack W of the entire resistance of the plow 22 and the ideal guide point P forms a line of action L on which draft forces operate. With the present invention it is possible to change the direction of the line of action L merely by repositioning the hitch 16 without any change in the relative position between the utility vehicle and plow 22.

The change in direction of the line of action L is illustrated by comparing FIG. 1 with FIG. 2. In both figures the relative position between the utility vehicle and the plow 22 is the same. However, the hitch 16 and the coupling unit 30 occupy differing positions. The change between these positions is the result of a corresponding control of the hitch 16. The coupling frame 18 in FIG. 2 is shifted to the side and to the right as seen in the direction of operation, compared to the coupling frame 18 in FIG. 1, that is, to the side of the furrow (that is towards the harvested field). Furthermore, in FIG. 2, the coupling frame 18 and the coupling carrier 38 are rotated slightly about a vertical axis compared to the orientation shown in FIG. 1, so that the tie rods 34, 36 are repositioned to a new desired ideal guide point P with respect to the existing tension forces, without the point of attack W of the plow changing its position.

With this system the position of the ideal guide point can be controlled without controlling the plow components or the coupling unit 30.

By moving the towing point towards the side of the furrow, the side forces acting on the contact surfaces of the plow 22 are reduced. Since the line of action L of the draft forces does not extend through the center M of the rear axle 10, a torque develops about the center M of the rear axle 10, which is perpendicular to the fore and aft axis of the utility vehicle. This torque increases with increasing distance h between the line of action L and the center M of the rear axle 10. In response to increasing torque, the operator must counter-steer to an increasing degree, in order to operate the utility vehicle straight through the furrow. By moving the towing point from the center M towards the side of the furrow, the friction forces are reduced while the torque increases.

Figure 3:
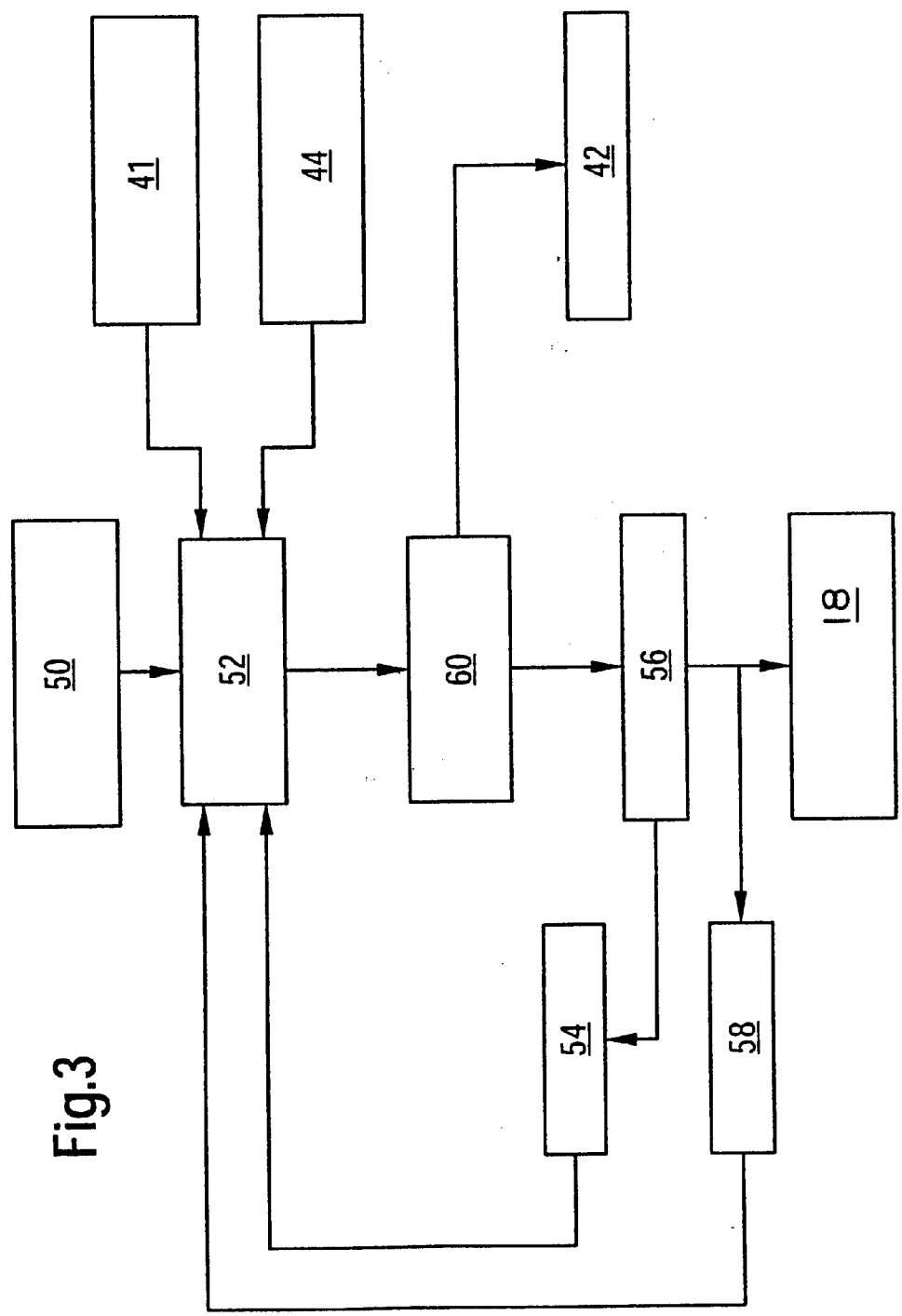
FIG. 3 is a block diagram of a control system associated with the hitch of FIG. 1.

Referring now to FIG. 3, a control system includes an operator control unit 50 which is located in the vehicle cab (not shown) and which includes operator control devices (not shown) such as one or more potentiometers, keys or a joystick, for the operator to input target values for the position of an ideal guide point, for the furrow width and for an angle of inclination of the plow (rotation about the longitudinal axis of the vehicle). The operator control unit 50 also includes operator control elements (not shown) for controlling the blocking element 42, in order to lock the coupling unit under certain operating conditions, such as for transport operations.

The signals from the operator control unit 50 are transmitted to an electronic control unit (ECU) 52. The ECU 52 receives sensed value signals from the rotary angle sensor 41, from the coupling unit 30 and the rotary angle sensor 44 of the rotary mechanism 20. The ECU 52 also receives signals from six force sensors 54 and from the length sensors 58 integrated into each of the six coupling elements 56, although for reasons of simplicity only one sensor is shown in FIG. 3.

The ECU 52 transmits control signals to a proportional valve unit 60 which controls the six coupling elements 56 and which controls the blocking cylinder 42. Changing the length of the coupling elements 56 controls the position and orientation of the coupling frame 18.

MODE OF OPERATION

First, using the operator control unit 50, the operator inputs target values for the furrow width, the operating depth, the width of cut, the angle of inclination as well as inputs for the type of control. The operator also inputs an operating depth for the plow 22.

From the signals of sensor 41 and sensor 44, the ECU 52 determines the position of the plow frame 24 relative to a set of reference positions, such as positions defined by the coupling frame 18 or the coupling carrier 38. From the signals from sensors 58, the position of the reference positions is determined relative to the utility vehicle. The actual furrow width is calculated from the position of the frame of the plow 24 relative to the reference positions and the position of the reference positions relative to the utility vehicle. The amount of sideways shifting of the hexapod 16 required to reposition the pre-determined furrow width is determined by comparing of the target furrow width value with the actual furrow width value. The blocking element 42 is preferably rigid during control of the furrow width.

The coordinates of the set of reference positions can be calculated from the signals from sensors 56 according to known algorithms. (Hebsacker, M.: Die Auslegung der Kinematik des Hexaglide—Methodik fuer die Auslegung paraleller Werkzeugmaschinen, VDI Berichte Nr. 1427, 1998. S.54–55) [The Design of the Kinematics of the Hexaglide—Methods for the Design of Parallel Machine Tools, VDI Reports No. 1425, 1998, Page 54–55].

By comparing a target plow inclination value with the actual value from sensor 44, the rotation of the hexapod 16 about a longitudinal axis required to reposition the plow 22, is determined by the ECU 52.

The hydraulic cylinder 40 can be controlled so that the plow frame 24 is pivoted relative to the coupling unit 30, in order to reposition the width of cut. The width of cut is detected by a distance sensor (not shown) integrated into the hydraulic cylinder 40 or by a rotary angle sensor (not shown) integrated into the shaft 28. The ECU 52 compares target and actual width of cut values, calculates an error signal and provides a control signal to a hydraulic valve (not shown) which repositions the hydraulic cylinder 40. The width of cut can thereby be repositioned automatically to a pre-determined target value.

After the furrow width, the angle of inclination and the width of cut have been repositioned, the plow 22 is moved to a pre-determined operational depth. As the plow 22 is inserted, the pre-determined operating depth target value is compared with an actual operating depth value which can be derived from the hexapod position signals from sensors 58. When the actual value corresponds to the target value, the blocking cylinder 42 is automatically unlocked. Now the operator can activate by key pressure a pre-determined type of control in order to maintain a minimum towing force or fuel consumption reduction (friction force control) or in order to maintain automatically a minimum torque about the normal axis of the vehicle (torque control). It is also possible to reposition an intermediate value in order to reposition a compromise between these two methods of control (mixed control). When the operator has activated one of these types of control (for example, at the beginning of the operating process) the control is automatically de-activated before turning when the plow is extracted and then automatically activated again after the insertion of the plow. The control according to the present invention can therefore be integrated into an HMS control (Headland Management System) as it was described, for example, in EP-A-0 697, 303.

When the friction force control is activated, the actual position of the plow frame 24 is determined relative to the coupling reference system by means of the rotary angle transmitter 41 of the coupling unit 30 and compared to a target position. The target position is pre-set by the operator by a potentiometer or by an input terminal. From the comparison of target and actual values a sideways shifting of the hexapod is calculated and performed by the control unit 52. By changing the target value the operator can pre-determine whether the towing point P is repositioned to a greater or lesser degree to the side of the furrow. In order to clarify to the operator the influence of the shifting of the towing point P towards the side of the furrow the towing force is shown on a display in the vehicle cab. For the determination of the towing force the pressures or forces in the hexapod cylinders 56 are measured by force sensors 54. From the known forces in the hexapod cylinders 56 the forces in longitudinal, transverse and vertical direction as well as the moments about the longitudinal, transverse and normal axes of the hexapod can be calculated. (Hebsacker, M. Die Auslegung der Kinematik des Hexaglide-Methodik fuer die Auslegung paralleler Werkzeugmaschinen VDI Berichte Nr. 1427, 1998, S. 54–55) [Hebsacker, M. The design of the kinematics of the hexaglide—Methods for the design of parallel machine tools, VDI reports No. 1427, 1998 Page 54–55).]

By such a control of the towing point P the result is that the plow 22 slides in the furrow with lower friction forces and without reduction of the stability of the plow movement. Thereby the fuel consumption is reduced, but simultaneously moments are generated about the normal axis of the vehicle that can compromise the operation of the utility vehicle and can be compensated by counter steering.

When the torque control is activated the actual value of the torque about the normal axis of the vehicle is calculated from the forces measured in the hexapod cylinders 56 and the parameters of the vehicle geometry and compared with a predetermined target value. As target value a minimal torque or a zero torque about the normal axis of the vehicle is assumed. If the actual value is greater than the target value the coupling frame 18 of the hexapod 16 is shifted closer to the longitudinal axis of the vehicle.

In mixed control a control deviation is formed in which, on the one hand, a value for the relative position of the plow frame 24 to the coupling system is utilized and on the other hand a value that represents a zero torque about the normal axis of the vehicle is utilized. The two values are combined in a pre-determined relationship, for example, by the use of a potentiometer that can be repositioned by the operator, for example, "mixed". This mixed value is then processed as control value. With mixed control a relatively low fuel consumption can be achieved with low torques about the normal axis of the vehicle.

Although the invention has been described in terms of only one embodiment, anyone skilled in the art will perceive many varied alternatives, modifications and variations in the light of the above description as well as the drawing all of which fall under the present invention.

Having described the preferred embodiment, it will become apparent that various modifications can be made without departing from the scope of the invention as defined in the accompanying claims.

What is claimed is:

1. A hitch system for coupling an implement to a utility vehicle, the implement transmitting draft forces to the vehicle, the hitch system comprising:
    a hitch mounted on the vehicle, the hitch having adjustable length coupling elements;
    a coupling unit pivotally coupled between the hitch and the implement, the coupling unit comprising a coupling carrier coupled to the hitch and a pair of tie rods, each tie rod being coupled to a frame element of the implement and to the coupling carrier; and a control system for controlling the length of the coupling elements in order to control the position of the implement relative to the vehicle and thereby control a direction of a line of action of the draft forces.

2. The hitch system of claim 1, wherein:

the hitch comprises six adjustable length coupling elements in a hexapod arrangement.

3. The hitch system of claim 1, further comprising:

length sensors for sensing lengths of the coupling elements.

4. The hitch system of any one of claims 1 through 3, further comprising:

force sensors for sensing tension and compression forces in the coupling elements.

5. The hitch system of claim 1, further comprising:

a coupling frame, the coupling elements having first ends coupled to a body of the vehicle, and having second ends coupled to the coupling frame; and a coupling carrier mounted on the coupling frame and fastened to the coupling unit.

6. The hitch system of claim 5, wherein:

the coupling frame is connected to the coupling carrier by a rotary mechanism.

7. The hitch system of claim 6, further comprising:

an inclination angle sensor for sensing an inclination of the implement frame.

8. The hitch system of claim 7, wherein:

the inclination angle sensor comprises a rotary angle sensor which senses an angular position of the rotary mechanism.

9. The hitch system of claim 1, further comprising:

force sensors for sensing forces in the coupling elements; and the control system automatically controlling the length of the coupling elements as a function of signals from said force sensors.

10. The hitch system of claim 1, wherein:

each tie rod is pivotally coupled to the frame element and pivotally coupled to the coupling carrier.

11. The hitch system of claim 1, wherein:

the tie rods are arranged so that they converge generally in a horizontal plane.

12. The hitch system of claim 1, further comprising:

a deflection angle sensor for sensing a position of the a frame of the implement frame with respect to the coupling carrier.

13. The hitch system of claim 12, wherein:

the deflection angle sensor is operatively coupled to a coupling between the coupling unit and the coupling carrier.

14. The hitch system of claim 1, further comprising:

a blocking device for preventing movement of the coupling unit.

15. The hitch system of claim 14, wherein:

the blocking device comprises a variable length element coupled between a frame of the implement and a coupling carrier.

16. The hitch system of claim 1, further comprising:

sensors for sensing a position implement relative to the vehicle; and the control system automatically controlling the length of the coupling elements as a function of signals from said sensors.

17. The hitch system of claim 16, further comprising:

force sensors for sensing forces applied to the coupling elements, and the control system controlling a direction of a line of action of the draft forces as a function of the sensed forces.

18. The hitch system of claim 16, wherein:

the control system, in response to signals from the sensors and a configuration of the vehicle and the implement, controls a direction of a line of action of the draft forces.

19. The hitch system of claim 16, wherein:

the control system, in response to signals from the sensors and a configuration of the vehicle and the implement, controls an orientation of the implement relative to the utility vehicle.

20. The hitch system of claim 16, further comprising:

length sensors for sensing the lengths of the coupling elements, the control system determining a set of reference positions relative to the vehicle as a function of values from the length sensors.

21. The hitch system of claim 20, further comprising:

an angle sensor for sensing an angle of inclination of the implement relative to the set of reference positions, and the control system controlling the length of the coupling elements as a function of the sensed angle of inclination to automatically control inclination of the implement relative to the vehicle.

22. The hitch system of claim 20, further comprising:

a deflection angle sensor for sensing an angle of the implement relative to the set of reference position, and the control system controlling the length of the coupling elements as a function of the sensed angle to control a position of a towing point without changing the position of the implement relative to the vehicle.

23. The hitch system of claims 16, wherein:

the coupling unit includes a blocking element operable to prevent movement of the coupling unit, and the control system automatically controlling the blocking element as a function of operating conditions and driving conditions.

* * * * *